United States Patent [19]

Purviance

[11] 4,112,617
[45] Sep. 12, 1978

[54] DEVICE FOR INJECTING A LIQUID INTO THE TRUNK OF A TREE

[76] Inventor: Billy Joe Purviance, 3737 N. Duncan Rd., Linden, Calif. 95236

[21] Appl. No.: 783,705

[22] Filed: Apr. 1, 1977

[51] Int. Cl.² ............................................. A01G 29/00
[52] U.S. Cl. .................................... 47/57.5; 118/408; 401/190
[58] Field of Search ............................. 47/57.5; 71/23; 111/7.1–7.5

[56] References Cited

U.S. PATENT DOCUMENTS

| 392,844 | 11/1888 | Best | 111/7.1 X |
| 1,152,241 | 8/1915 | Tomlinson | 47/57.5 UX |
| 2,323,773 | 7/1943 | Irish | 111/7.1 |
| 3,559,340 | 2/1971 | Good | 47/57.5 |
| 3,968,594 | 7/1976 | Kawakami | 47/57.5 |

FOREIGN PATENT DOCUMENTS

| 241,737 | 11/1962 | Australia | 47/57.5 |
| 1,015,864 | 10/1952 | France | 47/57.5 |

Primary Examiner—Robert E. Bagwill
Attorney, Agent, or Firm—Roger B. Webster

[57] ABSTRACT

A device for pressure-injecting a tree-treating liquid solution (such as an antibiotic, nutrient, or the like) into the trunk of a tree; the device comprising, essentially, an elongated, precisely tapered nozzle fixed on, and projecting from, a hand-manipulated carrier designed for use to forcefully thrust the nozzle—in effective jam-fitting and sealing relation—into a pre-drilled bore, of predetermined diameter, in the trunk of the tree, and to later remove the nozzle from such bore; the carrier having a passage therein leading at one end to communication with the nozzle, and means being provided to couple such passage at the other end with a source of the liquid solution delivered in metered quantity under pressure.

1 Claim, 2 Drawing Figures

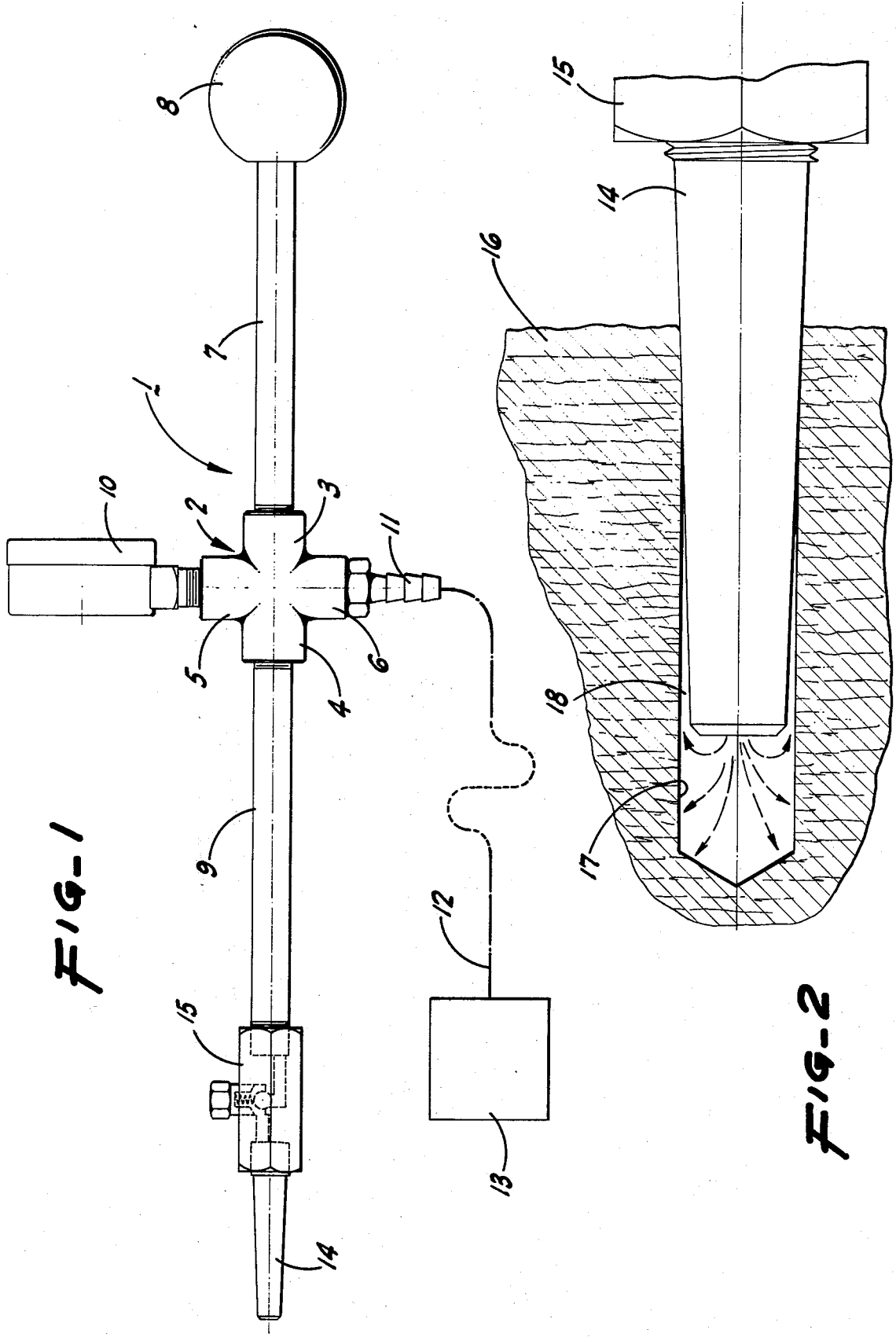

DEVICE FOR INJECTING A LIQUID INTO THE TRUNK OF A TREE

BACKGROUND OF THE INVENTION

1. Field of the Invention

In the maintenance of orchard and other trees, it is a known practice to pressure-inject a tree-treating solution into the trunk of a tree by means in a nozzle inserted in a pre-drilled bore therein. However, the devices heretofore available for the purpose have not been wholly satisfactory in that they were frequently inconvenient to manipulate or difficult to attach to a tree trunk, and—after attachment—the nozzle often did not maintain a proper seal with the tree trunk or tended to disengage from the bore therein. The present invention was conceived in a successful effort to provide a device, for the purpose described, which is not subject to the aforementioned problems.

2. The Prior Art

U.S. Pat. Nos. 318,609; 772,776; 1,583,900; 1,756,453; 2,870,576; 3,118,402; 3,136,091 and 3,295,254 represent the prior art to the extent known to applicant, and applicant has no knowledge of any prior art disclosing the particular structure of the herein-claimed tree-treating injecting device.

SUMMARY OF THE INVENTION

The present invention provides, as a major object, a novel device for pressure-injecting a tree-treating liquid solution into the trunk of a tree; the device comprising, essentially, an elongated, precisely tapered nozzle fixed on, and projecting from, a hand-manipulated carrier designed for use to forcefully thrust the nozzle—in effective jam-fitting and sealing relation—into a pre-drilled bore, of predetermined diameter, in the trunk of the tree, and to later remove the nozzle from such bore; the carrier having a passage therein leading at one end to communication with the nozzle, and means being provided to couple such passage at the other end with a source of the liquid solution delivered in metered quantity under pressure.

The present invention provides, as another important object, a device—as above—which can be readily, quickly, and effectively manually attached to a tree trunk without the need of tools, sealing washers, or bushings, and without the use of external retention straps or other comparable holding means. Also, the device can, with ease, be manually removed from a tree trunk.

The present invention provides, as an additional object, a device—as above—which is simple in structure, while being sturdy and affording a long, trouble-free operative life.

The present invention provides, as a further object, a tree-treating injecting device which is designed for ease and economy of manufacture.

The present invention provides, as a still further object, a practical and reliable tree-treating injecting device, and one which is exceedingly effective for the purpose for which it is designed.

BRIEF DESCRIPTION OF THE DRAWINGS

FIG. 1 is a side elevation of the tree-injecting device embodying the present invention; the fluid pressure supply and pumping unit, together with the connecting hose, being shown diagrammatically.

FIG. 2 is an enlarged, fragmentary view showing engagement of the nozzle in a pre-drilled bore in a tree trunk, and as in use.

DESCRIPTION OF THE PREFERRED EMBODIMENT

Referring now more particularly to the drawings and to the characters of reference marked thereon, the tree-treating injecting device, of the present invention, comprises a hand-manipulated carrier indicated generally at 1; such carrier comprising a readily manually portable structure as follows:

Substantially centrally of the carrier 1, there is a cross-type fitting 2 which includes—by reference to the working position of the device—a rear neck 3, a front neck 4, a top neck 5 and a bottom neck 6.

A solid rod 7 is threaded, in closure relation, into the rear neck 3 and extends a distance rearwardly thereof; the free or rear end of said rod 7 being fitted with a spherical thrust knob 8 adapted for hand gripping.

A rigid tube 9, comparable in length to rod 7, is threaded—in communication with fitting 2—into the front neck 4 and extends forwardly therefrom.

A pressure gauge 10 is threaded into the top neck 5 and upstands therefrom; such gauge preferably facing rearwardly for ease of reading from a point back of the device.

A hose-connection stem 11 is threaded into and depends from the bottom neck 6, and a long, flexible, high pressure hose 12 leads to, and at one end couples with, such stem 11. The tree-treating solution is fed to the hose 12 at the other end under pressure, and in metered quantity, from a supply and pumping unit, indicated generally and diagrammatically at 13. The tree-treating solution is fed at a pressure of 100 (or more) p.s.i.

An elongated, exteriorly tapered nozzle 14 is disposed co-axially beyond the front end of the tube 9; such nozzle 14 and tube 9 being rigidly connected by a check valve 15 threaded with and interposed therebetween. The check valve 15 is of one-way type and opens, under pressure from tube 9, only in the direction of the nozzle 14.

The above-described device is used in the following manner:

In preparation for pressure-injecting a tree-treating liquid solution into a tree trunk 16, a hole or bore 17 is drilled—preferably horizontally—into said tree trunk; such bore 17 being of a depth somewhat greater than the length of nozzle 14, and of a constant diameter approximately the diameter of the nozzle mid-point of its length.

The operator then manually grasps the carrier 1 with one hand on the knob 8, and—by suitable manipulation—the nozzle 14 is thrust forcefully into the bore 17. By reason of the relative diameters, the nozzle first engages in the outer end of the bore at a point substantially centrally of the ends of said nozzle. With continued thrust being imparted to the nozzle, it is pushed further into the bore 17 and which causes the nozzle to tightly crowd or bind in such bore. In order to permit of continued thrust on the nozzle, and resultant effective binding thereof in the bore, is has been ascertained that the nozzle be formed with a taper of 1½° to 2½°—with an optimum taper of 2° for orchard trees such as walnut, cherry, and pear trees.

With the nozzle crowded or jam-fitted into the bore 17, as above described, there is no tendency for said nozzle to accidentally escape or "blow" out of the hole during the injection phase of the operation.

Such injection phase includes the introduction from nozzle 14 and into the bore 17, of a tree-treating liquid solution in metered quantity and under relatively high pressure and which may exceed 100 p.s.i.; the liquid solution being fed to the nozzle 14 from the supply and pumping unit 13 by means of hose 12, stem 11, fitting 2, tube 9, and check valve 15.

The solution, under pressure in bore 17 and prevented from back-flow by check valve 15, permeates the fiber of the tree as intended and desired.

Also, as the point of jam-fitting of the nozzle 14 is substantially at the outer end of the bore 17, a space 18 exists about much of the in-place nozzle, and which space fills with the liquid solution to enhance its penetration into the fiber of the tree.

In addition to ease and speed of placement and removal of the device, and attainment of a most effective seal with the tree when the device is in place, other advantages are recognized in the fact that to apply and remove the device requires no tools and such device is entirely hand-manipulated; is retained in place without the need of external holding means such as straps or the like; connection and disconnection of the feed conduit is not necessary between injection operations; and no washers nor bushings are required between the nozzle and the tree trunk.

From the foregoing description, it will be readily seen that there has been produced such a tree-treating injecting device as substantially fulfills the objects of the invention as set forth therein.

While this specification sets forth in detail the present and preferred construction of the tree-treating injecting device, still in practice such deviations from such detail may be resorted to as do not form a departure from the spirit of the invention as defined by the appended claims.

I claim:

1. A device, for pressure injecting a tree-treating liquid solution into the trunk of a tree, comprising a central fitting of cross-type including front, rear, top, and bottom necks, the front neck being in communication with the top and bottom mecks, a rigid tube secured to and projecting forwardly from the front neck, an elongated, tapered nozzle fixed in communication with and projecting axially forward from the front end of the tube, a one-way check valve associated with the tube and opening in the direction of the nozzle, a rigid rod secured to and projecting rearwardly from the rear neck, a manual thrust member mounted on the rear end of the rod, the nozzle being adapted to be jam-fitted in a bore in the tree by hand-thrusting of said member, a hose-connection stem secured to and depending from the bottom neck, a flexible hose coupled to said stem, the hose being adapted to pressure-feed a metered quantity of the tree-treating solution through said stem, central fitting, tube, and nozzle when the latter is so jam-fitted in a bore in the tree, and a pressure gauge connected to and upstanding from the top neck.

* * * * *